United States Patent [19]

Brady

[11] 3,909,750

[45] Sept. 30, 1975

[54] APPARATUS FOR ENCODING A BINARY SIGNAL INTO A FREQUENCY MODULATED COHERENT PHASE-SHIFT KEYED SIGNAL

[75] Inventor: Douglas MacPherson Brady, Middletown, N.J.

[73] Assignee: Bell Telephone Laboratories, Incorporated, Murray Hill, N.J.

[22] Filed: June 10, 1974

[21] Appl. No.: 477,619

[52] U.S. Cl. ............... 332/9 R; 178/66 R; 325/163; 332/11 R

[51] Int. Cl.$^2$ ........................................ H04L 27/20

[58] Field of Search ........... 332/1, 11 R, 11 D, 9 R, 332/9 T; 325/38 A, 163, 30; 178/66 R

[56] References Cited

UNITED STATES PATENTS

| | | | |
|---|---|---|---|
| 3,242,262 | 3/1966 | Melas et al. | 325/30 X |
| 3,244,986 | 4/1966 | Rumble | 325/30 X |
| 3,699,479 | 10/1972 | Thompson et al. | 332/16 R |
| 3,750,051 | 7/1973 | Brady | 178/66 R X |

*Primary Examiner*—Alfred L. Brody
*Attorney, Agent, or Firm*—John J. Torrente; Bryan W. Sheffield

[57] ABSTRACT

Apparatus is disclosed for encoding a binary signal which takes on one or the other of first and second states during each of a plurality of T second intervals into a frequency modulated coherent phase-shift keyed signal which undergoes first and second phase deviations, respectively, during the T second intervals in which the binary signal is in its first and second states. More particularly, such encoding is accomplished by combining a cosinusoidal carrier signal, which has been amplitude modulated by a cosinusoidal signal of frequency ¼T, with a sinusoidal carrier signal, which has been amplitude modulated by a sinusoidal signal also of frequency ¼T, after the two amplitude modulated carrier signals have been inverted in polarity during first and second groups, respectively, of T second intervals of the binary signal.

4 Claims, 12 Drawing Figures

APPARATUS FOR ENCODING A BINARY SIGNAL INTO A FREQUENCY MODULATED COHERENT PHASE-SHIFT KEYED SIGNAL

BACKGROUND OF THE INVENTION

This invention relates to the encoding of digital signals into coherent phase-shift keyed signals and, in particular, to arrangements which can provide such encoding for high information rate digital signals.

It is known in the prior art to encode a binary signal which takes on one or the other of first and second states during each of a plurality of T second intervals into a frequency modulated coherent phase-shift keyed (FM-CPSK) signal. The latter signal is a constant amplitude, continuous phase coherent carrier signal which undergoes first and second phase changes or deviations during the T second intervals in which the binary signal takes on its first and second states, respectively. The first and second phase deviations of the FM-CPSK carrier signal thus are the encoded form of the first and second states of the binary signal.

Prior art arrangements for providing such encoding of a binary signal into a FM-CPSK signal, typically, require the use of digital circuitry, such as counter circuits or clock circuits, which must operate at speeds in excess of the information rate of the binary signal. As a result the aforesaid prior art arrangements are capable of encoding only binary signals having relatively slow information rates. It is therefore a primary object of the present invention to provide an arrangement which can encode high speed binary signals into FM-CPSK signals.

SUMMARY OF THE INVENTION

In accordance with the principles of the present invention, a binary signal which takes on one or the other of first and second states during each of a plurality of T second intervals, beginning with a first interval, is encoded into an FM-CPSK signal which undergoes first and second phase deviations during the T second intervals in which the binary signal is in its first and second states, respectively, by combining a cosinusoidal carrier signal, which has been amplitude modulated by a cosinusoidal signal of frequency ¼T, with a sinusoidal carrier signal, which has been amplitude modulated by a sinusoidal signal of the same frequency ¼T, after the two amplitude modulated carriers have been inverted in polarity during preselected groups of T second intervals of the binary signal.

More specifically, after being generated, the amplitude modulated cosinusoidal and sinusoidal carrier signals are applied, respectively, to first and second polarity control circuits, both of which have two modes of operation, an invert mode of operation and a non-invert mode of operation. Each of these circuits, in turn, receives a direction at the beginning of each T second interval of the binary signal, as to whether it should or should not switch from its present mode of operation to its other mode of operation. When the binary signal is not undergoing a change in state at the beginning of a particular interval, both circuits are directed to maintain their present modes of operation. When the binary signal is undergoing a change in state, however, then one or the other of the circuits is directed to switch its operating mode. More specifically, when the particular interval being begun is an odd interval, then the second circuit is directed to switch modes and the first circuit not to switch modes. When the interval is even, on the other hand, then the first circuit is directed to switch and the second circuit not to switch.

Operation of the first and second polarity control circuits in the aforesaid manner results in both the cosinusoidal and sinusoidal carrier signals being inverted or both being non-inverted during each T second interval in which the binary signal is in its first state and results in either one or the other of the signals being inverted during intervals in which the binary signal is in its second state. As a result, combining the two carriers, after they have been selectively inverted by the first and second control circuits, produces a constant amplitude cosinusoidal signal having a first frequency and, hence, a first phase deviation, during each of the former T second intervals and second frequency and, thus, second phase deviation during each of the latter T second intervals. Moreover, due to the manner in which the polarity control circuits have been switched, the resultant cosinusoidal signal is found to be continuous in phase when going from one T second interval to the next. Combining of the polarity-inverted amplitude modulated cosinusoidal and sinusoidal carriers thus results in a continuous phase constant amplitude cosinusoidal signal whose two phase deviations correspond to the two states of the binary signal and, hence, a resultant FM-CPSK signal.

DESCRIPTION OF THE DRAWINGS

A clearer understanding of the above-mentioned features of the present invention can be obtained by references to the following detailed description taken in conjunction with the following drawings, in which.

DETAILED DESCRIPTION

Figure 1:
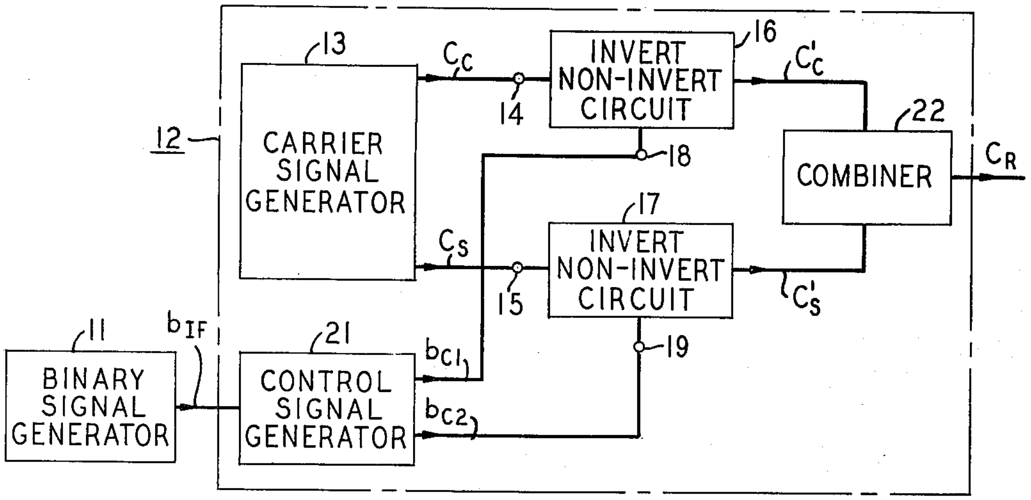
FIG. 1 shows an apparatus for generating a FM-CPSK signal, in accordance with the principles of the present invention.
Figure 2:
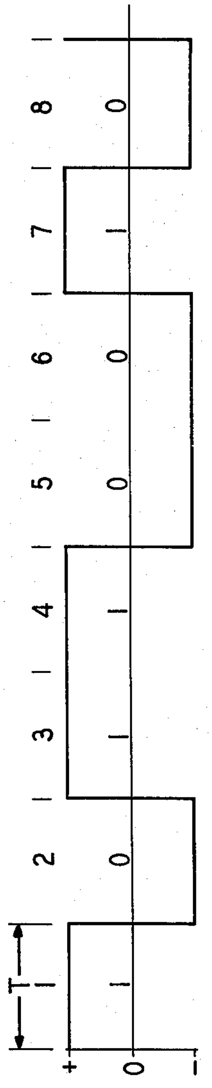
FIGS. 2–9 illustrate various signals in the apparatus of FIG. 1.

In FIG. 1, a binary signal generator 11 generates a binary information signal $b_{if}$ which takes on either one or the other of first and second states during each of a plurality of T second intervals. In FIG. 2, eight T second intervals of the signal $b_{if}$ are illustrated. As shown, the signal takes on its first state, represented by a positive going pulse and designated a 1 state, during each of the T second intervals 1, 3, 4 and 7, and its second state, represented by a negative going pulse and designated a 0 state, during each of the intervals 2, 5, 6 and 8.

The binary signal $b_{if}$ is to be encoded by apparatus 12 into a FM-CPSK signal having first and second phase deviations which represent the encoded forms of the first and second states, respectively, of the signal $b_{if}$. More particularly, apparatus 12 comprises a carrier signaal generator 13, which operates in synchronism with generator 11, to develop an amplitude modulated coherent cosinusoidal carrier signal $C_c$ and an amplitude modulated coherent sinusoidal carrier signal $C_s$. The generated signal $C_c$ is at a carrier frequency $f_o$ and is amplitude modulated by a cosinusoidal modulating signal $M_c$ which is at a modulating frequency of ¼T.

The generated signal $C_s$ is also at a carrier frequency $f_o$ and is amplitude modulated by a sinusoidal modulating signal $M_s$ which is at the same modulating frequency as $M_c$.

Figure 3:
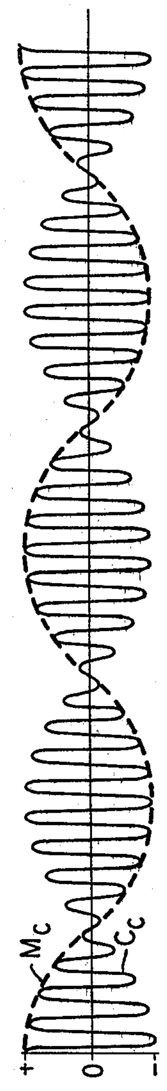
Figure 4:
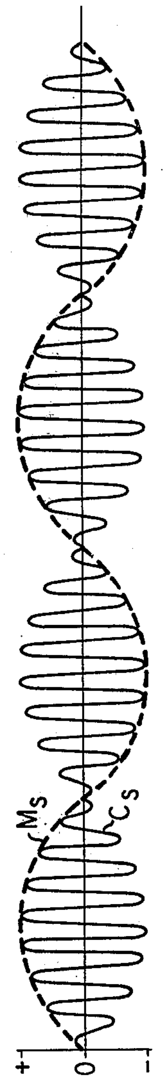

In FIGS. 3 and 4, respectively, the signals $C_c$ and $C_s$ are illustrated in solid line. As shown, the frequency $f_o$ of the signals is an integer multiple of 1/T and, in particular, is equal to 4/T. Also illustrated in FIGS. 3 and 4 in broken line are the modulating signals $M_c$ and $M_s$, respectively.

As can be observed from the aforesaid figures, the modulating signals $M_s$ and $M_c$, since they are both at a frequency ¼T, cause the carrier signals $C_s$ and $C_c$ to be at zero amplitude at the beginning of each odd and each even interval, respectively, of the binary signal $b_{if}$. Thus, the sinusoidal carrier signal $C_s$ is at zero amplitude at the beginning of a first set of alternate intervals (i.e., the odd intervals 1, 3, 5 and 7) of the signal $b_{if}$, while the cosinusoidal carrier $C_c$ is at zero amplitude at the beginning of the second set of alternate intervals, interleaved between the first set of intervals, (i.e., the even intervals 2, 4, 6 and 8) of the signal $b_{if}$. The significance of the aforesaid behavior exhibited by the signals $C_s$ and $C_c$ will become clear from the discussion to follow.

The signals $C_c$ and $C_s$ are coupled from their respective generator 13 into carrier signal input ports 14 and 15, respectively, of two similar invert non-invert circuits 16 and 17. Each of the circuits 16 and 17 has two modes of operation, an invert mode of operation and a non-invert mode of operation. In the invert mode of operation, each circuit ideally produces an output whose amplitude is the same as that of the applied carrier signal at the carrier input port of the circuit, but whose polarity is opposite to that of such input signal. In the non-invert mode of operation, on the other hand, each circuit ideally produces an output identical in both amplitude and polarity to the applied carrier signal.

The circuits 16 and 17 are caused to be in one or the other of their respective modes of operation by applying control signals to the circuits. In particular, control signal $b_{c1}$ is applied to control signal input port 18 of circuit 16 and control signal $b_{c2}$ is applied to control signal input port 19 of circuit 17. The control signals $b_{c1}$ and $b_{c2}$, in turn, are generated by a control signal generator 21 which operates in response to the binary signal $b_{if}$.

In accordance with the invention, the control signals $b_{c1}$ and $b_{c2}$ are generated by generator 21 such that the circuits 16 and 17 controlled thereby operate to selectively invert their respective applied carrier signals $C_c$ and $C_s$ to produce two partially inverted carrier signals $C_c'$ and $C_s'$, respectively, which when combined in combiner 22 result in a resultant carrier wave $C_r$ which is at a first frequency, and thus undergoes a first phase deviation, during each T second interval in which the binary signal $b_{if}$ is in its first state and which is at a second frequency, and thus undergoes a second phase deviation, during each T second interval in which the signal $b_{if}$ is in its second state. Moreover, in further accord with the invention, the signals $b_{c1}$ and $b_{c2}$ are generated such that the control exercised thereby over circuits 16 and 17 is such as to cause the aforesaid resultant signal $C_r$ to have a continuous amplitude and thus a continuous phase at the transitions between adjacent T second intervals of $b_{if}$.

More specifically, each of the signals $b_{c1}$ and $b_{c2}$ generated by generator 21 is a binary signal which takes on either a 0 state or a 1 state during each T second interval of the signal $b_{if}$. The particular state of each of the signals generated by the generator during a given T second interval of $b_{if}$ depends upon whether the interval is in the aforementioned first or second sets of intervals of $b_{if}$ and, therefore, is an odd or even interval and upon whether the state of signal $b_{if}$ has changed from that occurring in the immediately preceding interval. In accord with the invention, if the state of the signal $b_{if}$ in a given interval has not changed from the preceding interval, then the generator 21 causes the signals $b_{c1}$ and $b_{c2}$ to have the same states in the given interval as they had in the preceding interval. Moreover, further in accord with the invention, if the state of the signal $b_{if}$ in a given interval is changed from that of the preceding interval, and if the interval is in the first set of intervals (i.e., is odd), then the generator 21 causes the state of the signal $b_{c1}$ in the given interval to be the same as it was in the preceding interval, while it causes the state of signal $b_{c2}$ in the given interval to be changed from that of the preceding interval. Furthermore, in the case of a change in the state of the signal $b_{if}$, if the interval is in the second set of intervals (i.e., is even), and not the first set, then the generator 21 causes the state of $b_{c2}$ in the given interval to be the same as it was in the preceding interval, while it causes the state of the signal $b_{c1}$ in the given interval to be changed from that of the preceding interval.

Figure 5:
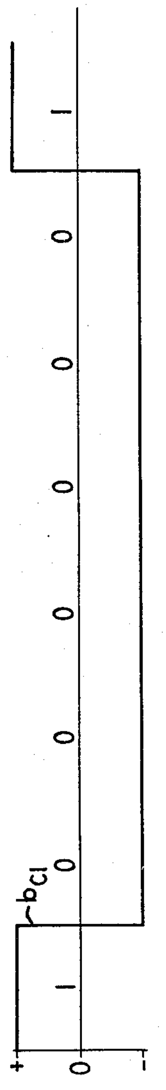
Figure 6:
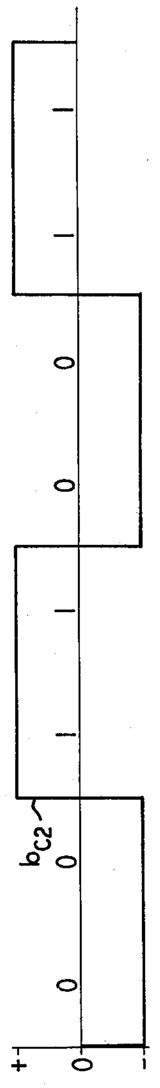

Generator 21 thus responds to the input signal $b_{if}$ by generating the two binary signals $b_{c1}$ and $b_{c2}$ illustrated in FIGS. 5 and 6, respectively. As shown, the 1 state of each of the latter signals is represented by a positive polarity pulse and the 0 state by a negative polarity pulse. Moreover, also as shown, the signals $b_{c1}$ and $b_{c2}$ are assumed to be in their 1 and 0 states, respectively, during the first interval of $b_{if}$.

Each of the signals $b_{c1}$ and $b_{c2}$ can be observed from FIGS. 4 and 5 to have the same polarity and thus same state in adjacent T second intervals in which the binary signal $b_{if}$ is of the same state (i.e., in the adjacent intervals 3 and 4 and the adjacent intervals 5 and 6). Furthermore, the signal $b_{c1}$ is seen to change state at the beginning of each even interval in which the state of the signal $b_{if}$ is changed from that of the preceding interval (i.e., the intervals 2 and 8), while it is seen not to change state at the beginning of each odd interval. The signal $b_{c2}$, on the other hand, is seen to change state at the beginning of each odd interval in which the state of the signal $b_{if}$ is changed from that of the preceding (i.e., the intervals 3, 5, and 7), while it is seen not to change state at the beginning of each even interval.

As above-indicated, the signals $b_{c1}$ and $b_{c2}$ control the operation of invert non-invert circuits 16 and 17, respectively. More particularly, application of each of the signals $b_{c1}$ and $b_{c2}$ to its respective invert non-invert circuit causes such circuit to be in its invert mode of operation, if the signal is at a negative polarity (i.e., its 0 state) and in its non-invert mode of operation, if the signal is at a positive polarity (i.e., in its 1 state). The circuit 16 controlled by signal $b_{c1}$ is thus in its invert mode of operation during the T second intervals 2–7 and in its non-invert mode during the T second intervals 1 and 8. The latter circuit, hence, is seen to change modes of operation at the beginning of each even interval in which the signal $b_{if}$ is of a changed state from the preceding interval. Likewise, the circuit 17 controlled by signal $b_{c2}$ is in its invert mode in the intervals 1, 2, 5, and 6 and in its non-invert mode in the intervals 3, 4, 7 and 8. This circuit thus is caused to switch operating modes at the beginning of each odd interval in which the signal $b_{if}$ is of a changed state from the preceding interval.

Figure 7:
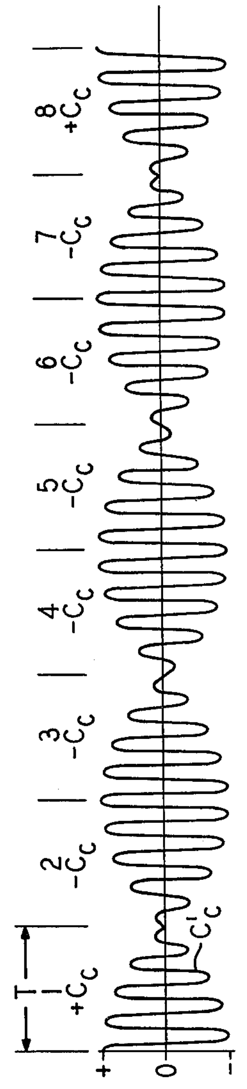
Figure 8:
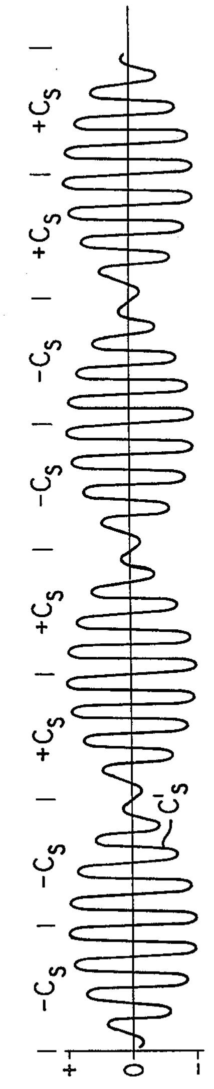

As can be appreciated operation of circuits 16 and 17 as aforesaid results in the circuits developing output carrier signals $C_c'$ and $C_s'$ as shown in FIGS. 7 and 8, respectively. More particularly, during each of the T second intervals in which the circuits are in their invert modes of operation, the circuits develop outputs which are the same in amplitude but opposite in polarity to their respective applied carrier signals, while during each of the intervals in which the circuits are in their non-invert modes, the circuits develop outputs which are the same in both amplitude and polarity to their respective applied carrier signals. Thus, as can be observed from FIG. 7, the signal $C_c'$ generated by circuit 16 during the intervals 2–7 is of the same amplitude but of opposite polarity to the applied carrier signal $C_c$, while during the intervals 1 and 8 the signal $C_c'$ is the same in both amplitude and polarity to the signal $C_c$. Likewise, from FIG. 8, it can be observed that the signal $C_s'$ generated by circuit 17 during the intervals 1, 2, 5, and 6 is of the same amplitude but of opposite polarity to the applied carrier signals $C_s$, while during the intervals 3, 4, 7 and 8 the signal $C_s'$ is the same in both amplitude and polarity to the signal $C_s$. The aforesaid inverted and non-inverted character of each of the signals $C_c'$ and $C_s'$ relative to their applied carrier signals $C_c$ and $C_s$, respectively, has been indicated in the FIGS. 7 and 8 by designating those intervals where no polarity inversion has occurred by $+C_c$ and $+C_s$, respectively, and by designating those intervals where polarity inversion has occurred by $-C_c$ and $-C_s$, respectively.

As is apparent from the illustrations of the generated carrier signals $C_c'$ and $C_s'$ operation of circuits 16 and 17 in response to control signals $b_{c1}$ and $b_{c2}$, respectively, has resulted in either the signal $C_c'$ or the signal $C_s'$ comprising an inverted portion of its respective applied carrier signal, during each of the T second intervals in which the signal $b_{if}$ is in its second state (i.e., negative). Thus during the intervals 3, 4, and 7 the signal $C_c'$ comprises a $-C_c$ and the signals $C_s'$ a $+C_s$, while during the interval 1, the signal $C_c'$ comprises a $+C_c$ and the signal $C_s'$ a $-C_s$. As a result, combining of the signals $C_c'$ and $C_s'$ in combiner 22 during the intervals 1, 3, 4 and 7 produces a resultant signal $C_r$ during such intervals which is of the form $\pm(C_c - C_s)$ and which can be readily shown to be a cosinusoidal carrier signal having a second frequency equal to the sum of the carrier frequency $f_o$ and the modulating frequency ¼T.

Moreover, it is also apparent from the illustrations of $C_c'$ and $C_s'$ that operation of circuits 16 and 17 has further resulted in both the signals comprising inverted portions or both comprising non-inverted portions of their respective applied carrier signals, during each T second interval in which $b_{if}$ is in its first state (i. e., positive). Thus during interval 8, $C_c'$ and $C_s'$ comprises a $+C_c$ and a $+C_s$, respectively, while during intervals 2, 5, and 6, $C_c'$ and $C_s'$ comprise a $-C_c$ and $-C_s$, respectively. As a result, combining the signals $C_c'$ and $C_s'$ in combiner 22 during these intervals produces a resultant signal $C_r$ which is of the form $\pm(C_c + C_s)$ and which can be readily shown to be a cosinusoidal carrier signal having a first frequency equal to the difference between the carrier frequency $f_o$ and modulating frequency ¼T.

Figure 9:
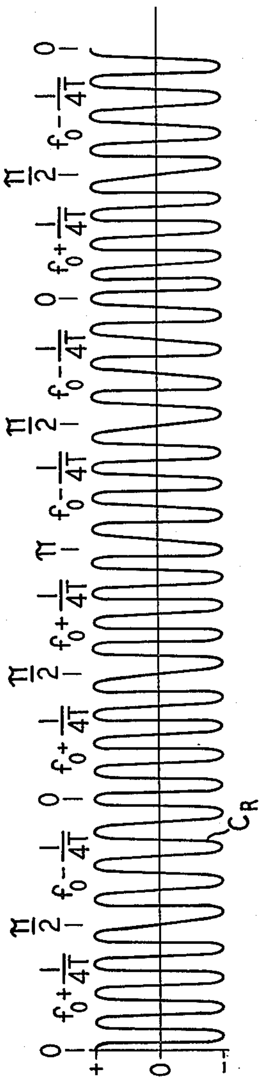

FIG. 9 shows the aforesaid resultant cosinusoidal carrier signal $C_r$ produced by combiner 22. The particular frequencies taken on by the carrier in each of the T second intervals are designated also. As can be observed, during the intervals 1, 3, 4 and 7 the signal $C_r$ is at a first frequency ($f_o$ + ¼T) while during the intervals 2, 5, 6 and 8 the signal is at a frequency ($f_o$ − ¼T).

Also noted in FIG. 9, at the beginning of each T second interval, is the phase of the signal $C_r$ relative to that of an unmodulated carrier signal at the carrier frequency $f_o$. The resultant relative phase change or deviation undergone by $C_r$ during each interval is obtained by subtracting the indicated phase values. Thus, in each of the intervals where the signal $C_r$ is at a frequency ($f_o$ + ¼T), the signal undergoes a relative phase change of $+\pi/2$, while in each interval where the signal is at a frequency ($f_o$ − ¼T), the signal undergoes a relative phase change or deviation of $-\pi/2$. Hence, the signal $C_r$ undergoes a first phase deviation of $+\pi/2$ in each of the intervals 1, 3, 4 and 7 where $b_{if}$ is in its first state and a second phase deviation of $+\pi/2$ in each of the intervals 2, 5, 6 and 8 in which $b_{if}$ is in its second state. The phase deviations of the signal $C_r$ thus represent the encoded form of the states of the signal $b_{if}$.

It can be further observed from FIG. 9, moreover, that the signal $C_r$ has a continuous amplitude and, hence, a continuous phase at each transition point marking the beginning of a particular T second interval. This characteristic of the signal $C_r$ comes about from selecting the modulating signals $M_c$ and $M_s$ to have a frequency of ¼T and from the switching circuits 16 and 17 in the above-described manner. More particularly, as above described, since the signals $M_s$ and $M_c$ have frequencies of ¼T, the signals $C_s$ and $C_c$ and, hence, the signals $C_s'$ and $C_c'$ are caused to have zero amplitudes at the beginning of the aforementioned first and second sets (i.e., odd and even) intervals, respectively, of $b_{if}$. As a result, at the beginning of each odd interval, the amplitude of $C_c'$ controls the amplitude of the resultant signal $C_r$, while, at the beginning of each even interval, the amplitude of $C_s'$ controls the amplitude of the signal $C_r$. However, since circuit 16, which is generating $C_c'$ by selectively inverting the applied signal $C_c$, is directed not to change modes of operation at the beginning of each odd interval, the amplitude of the signal $C_c'$ and, hence, the amplitude of the signal $C_r$ controlled thereby remains continous at the beginning of each such off interval. Likewise, since the circuit 17, which is generating $C_s'$ by selectively inverting the signal $C_s$, is directed not to change modes at the beginning of each even interval, the amplitude of the signal $C_c'$ and, hence, the amplitude of $C_r$, also remains continuous at the beginning of each such even interval.

As can be appreciated from the above, therefore, apparatus 12 has successfully produced a FM-CPSK signal $C_r$ which carries the first and second states of the input binary signal $b_{if}$ via first and second phase deviations.

Figure 10:
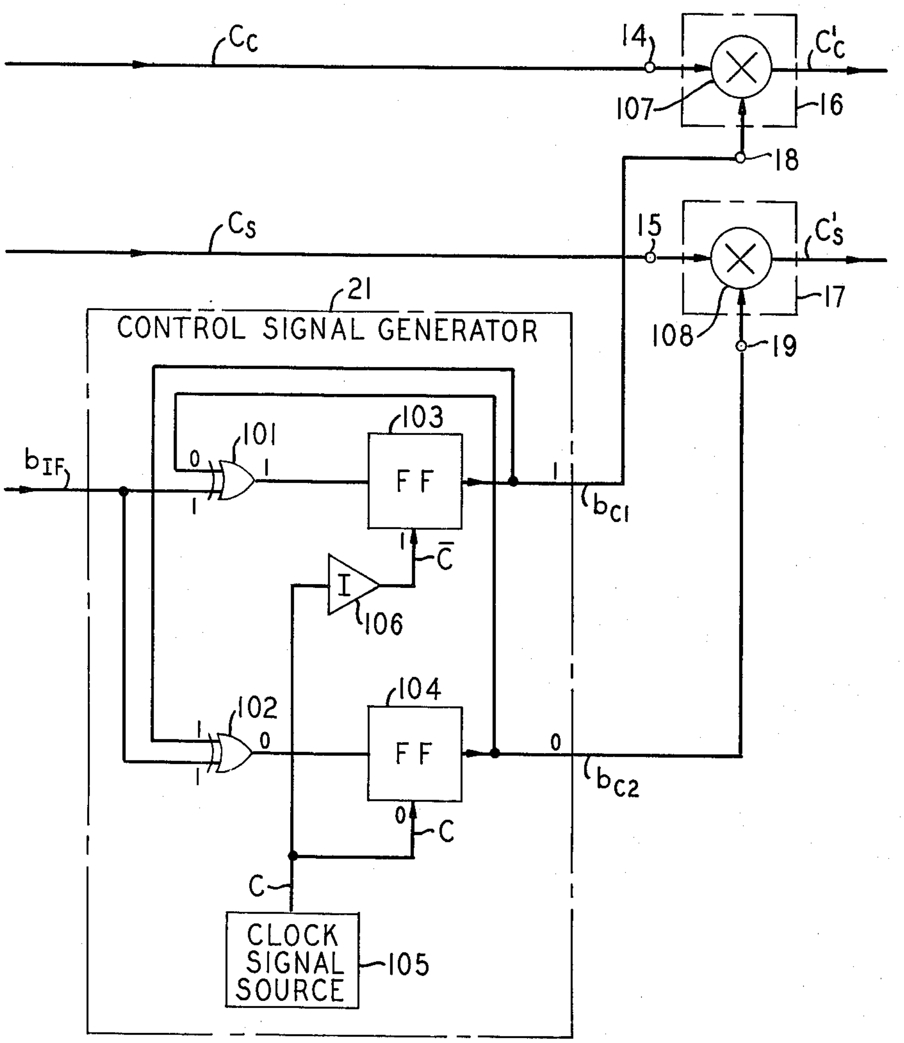
FIG. 10 shows particular circuitry which can be employed in the apparatus of FIG. 1.

FIG. 10 illustrates a particular configuration of logic circuits which can be employed for control signal generator 21. Additionally FIG. 10 shows apparatus for performing the functions of invert non-invert circuits 16 and 17.

More particularly, as shown, generator 21 comprises first and second exclusive or circuits 101 and 102, each of which receives as one of its inputs the binary information signal $b_{if}$. The circuits 101 and 102 additionally receive as their other inputs, the control signals $b_{c1}$ and $b_{c2}$ developed by flip-flop 103 and 104, respectively. In response to their input signals, the circuits 101 and 102 develop output signals $b_1$ and $b_2$, respectively. The signals $b_1$ and $b_2$, in turn, are applied as inputs to flip-flop circuits 103 and 104, respectively. The flip-flop circuits 103 and 104 are additionally fed control signals $\overline{C}$ and C, respectively. The latter control signal C is generated by a clock signal source 105 which operates in synchronism with the signal $b_{if}$. The former signal, on the other hand, is derived by passage of the clock signal C through an inverter 106.

Figure 11:
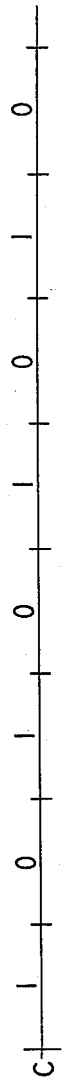
FIGS. 11–12 illustrate various signals in the circuitry of FIG. 10.
Figure 12:
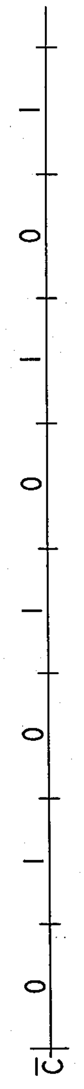

The clock signal C generated by source 105 is a binary signal which changes state at the beginning of each interval of $b_{if}$. Thus, as shown in FIG. 11, the signal C is in a 1 state in the inteval 1, a 0 state in the interval 2, etc. Inverter 106 responds to the aforesaid signal C by generating a signal $\overline{C}$ having a state in each interval which is inverted from that of the signal C. Thus, as shown in FIG. 12, the signal $\overline{C}$ has a 0 state in the interval 1, a 1 state in the interval 2, etc.

Each of the flip-flops 103 and 104 is controlled by its respective signal C or $\overline{C}$ in the same mannr. In particular, each flip-flop is permitted to respond to a change in the state of its applied signal $b_1$ or $b_2$ only when its respective control signal is changing from its 0 state to its 1 state. As a result, flip-flop 103 is only able to respond to a change in its input $b_1$ at the beginning of each even interval of the signal $b_{if}$. Likewise, flip-flop 104 is only able to respond to a change in state of its input $b_2$ at the beginning of each odd interval of the signal $b_{if}$.

In order to illustrate that the signals $b_{c1}$ and $b_{c2}$ generated by circuit 21 in FIG. 10 conform to the required signals shown in FIGS. 5 and 6, respectively, operation of the circuit will be followed through the first three intervals of the signal $b_{if}$. More particularly, assuming that the states of the signals in circuit 21 are initially as shown in FIG. 10, the occurrence of 1 state of the signal $b_{if}$ during interval 1 causes no change in the outputs of circuits 101 and 102. As a result, the output of the flip-flop which is permitted to change state at the beginning of this interval, i.e., flip-flop 104, as well as the output of the flip-flop which cannot change state, i.e., flip-flop 103, remain the same. Thus, during interval 1, $b_{c1}$ is maintained at a 1 state and $b_{c2}$ at a 0 state.

At the beginning the interval 2, the signal $b_{if}$ changes from its 1 state to its 0 state. This change is reflected at the inputs to circuits 101 and 102. Since, however, the other input $b_{c2}$ to circuit 101 cannot change state, due to the inability of flip-flop 104 to change state, the 0 state of $b_{if}$ causes the signal $b_1$ from circuit 101 to change to its 0 state. The aforesaid 0 state of $b_1$ is received by flip-flop 103 which at this time is able to change state and, hence, does so changing the state of $b_{c1}$ from 1 to 0. Thus, during interval 2, $b_{c1}$ is at a 0 state and $b_{c2}$ is also at a 0 state.

Following the operation of circuit 21 for one more interval, at the start of the third interval, the signal $b_{if}$ again changes state, going from its 0 state to its 1 state. Since, at the start of this interval, $b_{c1}$ cannot change state due to the inability of flip-flop 103 to change state, the 1 state of $b_{if}$ and 0 state of $b_{c1}$ at the input of circuit 102 causes a 1 state output. This output is received by flip-flop 104, which at this time is able to change state, and does so changing the state of $b_{c2}$ from 0 to 1. Thus, during interval 3 the signal $b_{c1}$ is at a 0 state and the signal $b_{c2}$ is at a 1 state.

As above indicated, also shown in FIG. 10, are the invert non-invert circuits 16 and 17 which receive the signals $b_{c1}$ and $b_{c2}$, respectively, generated by circuit 21. As illustrated, the circuit 16 and 17 comprise balanced modulators 107 and 108, respectively, Each of the modulators 107 and 108 functions as multiplier and multiplies its respective applied carrier signal by a +1, if its input control signal is in a 1 state, and by a −1 if its control signal is in a 0 state. As is apparent such operation of modulators 101 and 108 will result in the generation of the signals $C_c'$ and $C_s'$ illustrated in FIGS. 7 and 8, respectively.

As can be noted from the above discussion of FIGS. 1 and 10, apparatus 12 does not employ any circuitry which must be switched in operation in a time less than the time T occupied by each state of binary signal $b_{if}$. As a result, it is found that apparatus 12 is capable of encoding binary signals having high bit rates, i.e., bit rates of the order of 1 Mb/s.

In all cases, it is understood that the above-described arrangements are merely illustrative of the many possible specific embodiments which represent applications of the present invention. Numerous and other varied arrangements can be readily devised in accordance with the principles of the present invention without departing from the spirit and scope of the invention.

What is claimed is:

1. Apparatus for encoding a binary signal having a pulse period T into a frequency-modulated coherent phase-shift keyed signal, which comprises:

means for generating an amplitude-modulated, cosinusoidal carrier wave of frequency $f_o$, the signal modulating said carrier wave comprising a cosinusoidal wave of frequency ¼T;

means for generating an amplitude-modulated, sinusoidal carrier wave of frequency $f_o$, the signal modulating said carrier wave comprising a sinusoidal wave of frequency ¼T;

means, responsive to said binary signal, for generating first and second binary control signals, the logical value of said first binary control signal being changed if, and only if, a change in the logical value of the binary signal to be encoded occurs at the beginning of alternate time slots in said binary signal, the logical value of said second binary control signal being changed if, and only if, a change in the logical value of the binary signal to be encoded occurs at the beginning of the remaining time slots in said binary signal, said first and second binary control signals initially having opposite logical values:

means for combining the output of said cosinusoidal wave generating means with the output of said sinusoidal wave generating means;

means, interposed between said combining means and said cosinusoidal wave generating means and responsive to said first binary control signal, for selectively inverting said cosinusoidal carrier wave; and means, interposed between said combining means and said sinusoidal wave generating means and responsive to said second binary control signal, for selectively inverting said sinusoidal carrier wave, whereby the output of said combining means comprises the desired phase-shift keyed signal, which signal selectively assumes the frequency $(f_0 + 1/4T)$ or $(f_0 - 1/4T)$ depending upon the instantaneous logical value of the binary signal to be encoded.

2. The apparatus according to claim 1 wherein $f_0$, the frequency of both said cosinusoidal and said sinusoidal carrier wave, is harmonically related to the frequency 1/T.

3. The apparatus according to claim 1 wherein said cosinusoidal and sinusoidal wave inverting means comprises a balanced modulator.

4. The apparatus according to claim 1 wherein said means for generating said first and second binary control signals comprises:

a first logic circuit whose output signal comprises said first binary control signal;

a second logic circuit whose output signal comprises said second binary control signal;

a third logic circuit responsive to said first binary control signal and to said binary signal for developing an output signal which has two states and which changes state as a function of changes in state of said first binary control signal and said binary signal;

a fourth logic circuit responsive to said second binary control signal and to said binary signal for developing an output signal which has two states and which changes state as a function of changes in state of said second control signal and said binary signal;

means for applying the output signal from said third logic circuit to said first logic circuit;

means for applying the output signal from said fourth logic circuit to said second logic circuit;

a clock circuit synchronized with said binary signal, the output of said clock circuit being connected to said first and second logic circuits; and means interposed between said clock circuit and said first logic circuit for inverting the polarity of the clock pulses from said clock circuit.

* * * * *